US012613539B2

(12) United States Patent     (10) Patent No.:     US 12,613,539 B2

Oe et al.     (45) Date of Patent:     Apr. 28, 2026

(54) FLUID CONTROL DEVICE, FLUID CONTROL SYSTEM AND FLUID CONTROL METHOD

(71) Applicant: HORIBA STEC, Co., Ltd., Kyoto (JP)

(72) Inventors: Kenichi Oe, Kyoto (JP); Daichi Kunita, Kyoto (JP); Kazuya Shakudo, Kyoto (JP)

(73) Assignee: HORIBA STEC, Co., Ltd., Kyoto (JP)

( * ) Notice:     Subject to any disclaimer, the term of this patent is extended or adjusted under 35 U.S.C. 154(b) by 492 days.

(21) Appl. No.: 18/047,577

(22) Filed:     Oct. 18, 2022

(65)     Prior Publication Data

US 2023/0140776 A1     May 4, 2023

(30)     Foreign Application Priority Data

Oct. 29, 2021     (JP) ................................. 2021-177284

(51) Int. Cl.
    *G05D 7/06*          (2006.01)
    *F16K 27/00*        (2006.01)
(52) U.S. Cl.
    CPC ......... *G05D 7/0652* (2013.01); *F16K 27/003* (2013.01)
(58) Field of Classification Search
    CPC ................ F16K 27/003; F15B 13/0817; F15B 13/0832; F15B 13/0835; G05D 7/0652
    See application file for complete search history.

(56)     References Cited

U.S. PATENT DOCUMENTS

| | | | | |
|---|---|---|---|---|
| 5,617,898 A * | 4/1997 | Nagai | ................. | F15B 13/0864 |
| | | | | 137/884 |
| 6,142,182 A * | 11/2000 | Akimoto | ............. | F15B 13/0864 |
| | | | | 137/884 |
| 6,205,409 B1 | 3/2001 | Zvonar | | |
| 6,578,600 B1 * | 6/2003 | Young, Jr. | ......... | H01L 21/67017 |
| | | | | 118/715 |
| 6,954,358 B2 * | 10/2005 | King | ........................ | G06F 1/206 |
| | | | | 702/132 |
| 7,216,019 B2 | 5/2007 | Tinsley et al. | | |
| 10,221,960 B2 * | 3/2019 | Hamm | ................ | F15B 13/0814 |
| 10,830,367 B2 * | 11/2020 | Aikawa | .................... | F17D 3/01 |
| 11,137,779 B2 * | 10/2021 | Hirata | ................... | G05D 7/0635 |
| 12,092,229 B2 * | 9/2024 | Qi | ........................ | F15B 13/085 |

(Continued)

FOREIGN PATENT DOCUMENTS

| | | | | | |
|---|---|---|---|---|---|
| CN | 106870478 A | * | 6/2017 | ............. | F15B 11/08 |
| JP | 2005149075 A | | 6/2005 | | |
| JP | 2006319190 A | | 11/2006 | | |

(Continued)

OTHER PUBLICATIONS

Machine Translation CN106870478A (Year: 2017).*

(Continued)

*Primary Examiner* — Michael R Reid

(74) *Attorney, Agent, or Firm* — Alleman Hall LLP

(57)     ABSTRACT

A fluid control device includes a body inside which is formed a flow path, a fluid control valve that is mounted on the body and controls a fluid flowing through the flow path, and a casing that is mounted on the body in such a way as to house the fluid control valve. A sloping surface that slopes towards the body is formed on a top surface of the casing, which is a surface facing towards an opposite side from the body.

11 Claims, 10 Drawing Sheets

(56)     References Cited

U.S. PATENT DOCUMENTS

2015/0370260 A1 *  12/2015  Takijiri ............... G05D 7/0635
                                                    700/282

FOREIGN PATENT DOCUMENTS

| JP | 2014215830 A | 11/2014 |
| JP | 2016021219 A | 2/2016 |
| JP | 2017227326 A | 12/2017 |

OTHER PUBLICATIONS

Japan Patent Office, Office Action Issued in Application No. 2021177284, Jun. 26, 2025, 10 pages.
Japan Patent Office, Office Action Issued in Application No. 2021177284, Sep. 18, 2025, 5 pages.

* cited by examiner

REAR ◄———————► FRONT

LONGITUDINAL
DIRECTION

REAR ← LONGITUDINAL DIRECTION → FRONT

FLUID CONTROL DEVICE, FLUID CONTROL SYSTEM AND FLUID CONTROL METHOD

TECHNICAL FIELD

The present invention relates to a fluid control device, a fluid control system, and a fluid control method that are used to control a flow rate or pressure of a fluid.

TECHNICAL BACKGROUND

As, for example, a mass flow controller, which is one of the above-mentioned types of fluid control device, there is known a mass flow controller that is provided with a body inside which is formed a flow path, a fluid control valve that is mounted on the body, and a flat, rectangular-parallelepiped shaped casing that is mounted on the body in such a way as to house the fluid control valve (see, for example, Patent Document 1).

In recent years, fluid control devices of this type have been formed so as to be connected via an industrial network of a predetermined standard to a plurality of information processing devices for users, and in such a way that various types of information can be communicated between the respective fluid control devices and between the respective information processing devices of the users. In such cases, in order to enable the fluid control devices to conform with standards such as, for example, EtherCAT, which is an industrial network, and the like, in addition to communication ports to which communication cables are connected there are demands for status lamps that show an operational status of a device and operating switches (these may also be known as communication ports and the like) to be provided in the casing.

DOCUMENTS OF THE PRIOR ART

Patent Documents

Patent Document 1 Japanese Patent Application Publication Laid-Open (JP-A) No. 2016-021219

DISCLOSURE OF THE INVENTION

Problems to be Solved by the Invention

It is preferable that communication ports that conform with communication standards such as the aforementioned EtherCAT and the like be all provided on a top surface of the casing so as to improve user operability and viewability. However, as is shown in Patent Document 1, it is common for a plurality of these fluid control devices such as mass flow controllers and the like to be arranged next to each other in a width direction when they are being used and, in order to reduce the area occupied by each device, there are demands for the devices to be made slimmer so that there are restrictions on the device dimensions in the transverse and longitudinal directions. Conventionally, because of this, it has not been possible to secure a large enough installation area on the top surface of the casing for all of the communication ports and the like to be provided, and a portion of the communication ports and the like have conventionally been provided on a front surface and rear surface and the like of the casing.

The present invention was therefore conceived in order to solve the above-described problems, and it is a principal object thereof to increase the installation space for communication ports and the like on the top surface of a casing in a fluid control device while simultaneously enabling the device to be made slimmer.

Means for Solving the Problem

In other words, a fluid control device according to the present invention is provided with a body inside which is formed a flow path, a fluid control valve that is mounted on the body and controls a fluid flowing through the flow path, and a casing that is mounted on the body in such a way as to house the fluid control valve, and is characterized in that a sloping surface that slopes towards the body is formed on a top surface of the casing, which is a surface thereof that faces towards an opposite side from the body.

If this type of structure is employed, then because a sloping surface that slopes towards the body is formed on a top surface of the casing, compared with a conventional structure in which the top surface of the casing simply extends flat along the entire surface of the body, it is possible to increase the area of the top surface. As a consequence, in spite of there being restrictions on the dimensions in the transverse and longitudinal directions of the body, it is nevertheless possible to increase the area of the top surface where communication ports and the like can be installed. Note that the description "slopes towards the body" means that this sloping surface is not parallel with the surface of the body on which the casing and the fluid control valves are mounted. Furthermore, the description "top surface" in the present specification refers to 'a surface of the casing that faces towards an opposite side from the body' irrespective of whether this surface is an upper or lower surface or is located on the left or right sides. In a state in which a fluid control device has been installed, if the casing is facing downwards towards the body, then this downward-facing surface of the casing forms the top surface, while if the casing faces in a sideways direction towards the body, then this sideways-facing surface of the casing forms the top surface.

A specific aspect that clearly demonstrates the effects of this fluid control device is a structure in which one or more selected from (i) communication ports to which communication cables are connected, (ii) status lamps showing operational statuses of the fluid control device, and (iii) operating switches that are used to perform operations on the fluid control device are provided on the top surface.

In the fluid control device, it is preferable that a flat surface that is parallel to the body be formed on the top surface of the casing, and that the communication ports be provided on the top surface, and that the status lamps or the operating switches be provided on the sloping surface.

If this type of structure is employed, then because communication ports are provided on a flat surface of the top surface, a user is able to insert or detach a communication cable from directly above the fluid control device without devices such as, for example, air valves or the like that are provided at the front or rear of the fluid control device interfering with this operation so that operability is improved.

In contrast, because status lamps and operating switches are provided on a sloping surface that is different from the flat surface on which communication ports are provided, a user is able to confirm the status switches and operate the operating switches without communication cables interfering with these operations and without the user having to look down at the top surface from directly above.

In this fluid control device, it is preferable that two of the communication ports be provided on the flat surface, and that one of the status lamps that shows a communication state of the relevant communication port be provided adjacent to each of the communication ports.

If this type of structure is employed, then because a communication port and a status lamp that shows the communication state of that communication port are placed near to each other, it is possible to easily verify the respective communication states of the respective communication ports. Note that the description "are placed near to each other" refers to a distance that enables a communication port and the status lamp that corresponds to that communication port to both be viewed simultaneously at a single glance, and may be, for example, the distance between two communication ports.

A specific aspect of this fluid control device is a structure in which the communication ports conform with an industrial network such as Industrial Ethernet and the like.

A further specific aspect of this fluid control device is a structure in which the top surface is formed in an elongated shape, and the flat surface and the sloping surface are formed so as to be continuous in the longitudinal direction of the top surface.

A further specific aspect of this fluid control device is a structure in which the sloping surface is formed at one-end side or at another-end side in the longitudinal direction of the top surface of the casing.

A further specific aspect of this fluid control device is a structure in which a power supply connector to which is connected a predetermined power supply cable is provided either at a front surface or a rear surface of the casing so as to face towards one side or another side in the longitudinal direction.

In addition, it is preferable that the power supply connector be provided on a bottom surface of a recessed portion that is formed in the front surface or rear surface of the casing.

In the above-described fluid control device, it is common for threaded holes or the like that are used to fix the fluid control device to a panel or the like to be provided in the vicinity of a front surface or a rear surface of the casing. Because of this, providing the power supply connector in a recessed portion that is formed in the front surface or rear surface of the casing makes it possible for the portion of the power supply connector that protrudes from the front surface or rear surface to be reduced. As a result, it is difficult for the power supply connector to interfere with the hands or tools of a user when the fluid control device is being fixed to a panel or the like via screws or bolts so that workability is improved when this mounting operation is being performed.

In a case in which this recessed portion is formed in the front surface or rear surface, it is preferable that the flat surface of the casing extend further outwards in the longitudinal direction than the bottom surface of the recessed portion that is formed in the front surface or rear surface.

If this type of structure is employed, then it becomes possible to secure a sufficient area to install communication ports or the like in the top surface of the casing while simultaneously improving workability during a mounting operation. Note that, in a case in which the recessed portion is formed in the front surface, the term "further outwards" refers to a position further to the front than the bottom surface of the recessed portion, while in a case in which the recessed portion is formed in the rear surface, the term "further outwards" refers to a position further to the rear than the bottom surface of the recessed portion.

Moreover, a fluid control system of the above-described present invention is characterized in being provided with the above-described fluid control device, and in that the top surface of the fluid control device is formed in an elongated shape, and in that air-pressure valves that shut off a flow of a fluid flowing through the flow path are provided at the front and at the rear in the longitudinal direction of the top surface of the casing.

Furthermore, a fluid control method of the present invention is characterized in that a fluid is controlled using a fluid control system provided with a fluid control device that includes a body inside which is formed a flow path, a fluid control valve that is mounted on the body and controls a fluid flowing through the flow path, and a casing that is mounted on the body in such a way as to house the fluid control valve, and in which a sloping surface that slopes towards the body is formed on a top surface of the casing, which is a surface thereof that faces towards an opposite side from the body and is formed in an elongated shape, and with air-pressure valves that are provided at the front and at the rear in the longitudinal direction of the top surface of the casing and that shut off a flow of a fluid flowing through the flow path.

If the above-described fluid control system and fluid control method are employed, then the equivalent actions and effects as those provided by the above-described fluid control device of the present invention can be demonstrated.

Effects of the Invention

According to the present invention that is formed in the manner described above, in a fluid control device it is possible to increase the installation space for communication ports and the like on the top surface of a casing while simultaneously enabling the device to be made slimmer.

BEST EMBODIMENTS FOR IMPLEMENTING THE INVENTION

Hereinafter, an embodiment of a fluid control device 100 according to the present invention will be described with reference to the drawings.

Figure 1:
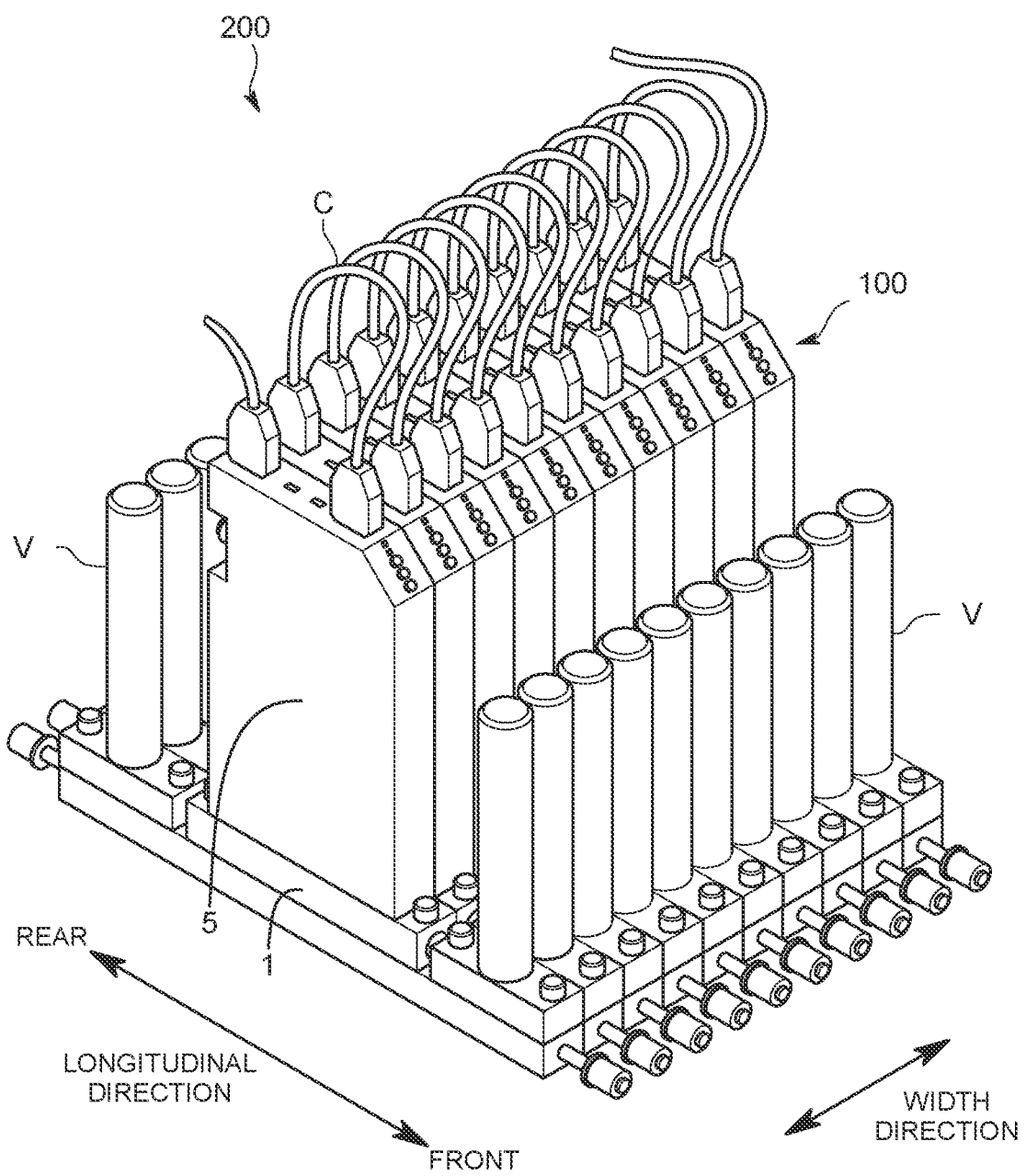
FIG. 1 is a perspective view showing a structure of a fluid control system of the present embodiment.

The fluid control device 100 of the present embodiment is what is known as a mass flow controller, and is used, for example, to control a flow rate of a fluid such as a gas or the like that is supplied to a chamber. As is shown in FIG. 1, a fluid control system 200 is formed by placing a plurality of the fluid control devices 100 adjacent to each other in a width direction thereof, and the fluid control devices 100 are formed such that they individually control the flow rate of the fluid that is flowing through the gas line connected to each fluid control device 100. Air-pressure valves V that are used to block the flow of the fluid flowing through the respective gas lines are provided at the front and at the rear in the longitudinal direction of each fluid control device 100. In addition, each of the fluid control devices 100 that make up the fluid control system 200 is connected to an information processing device for users (not shown in the drawings) via an industrial network, and is formed so as to enable various types of information to be exchanged between the respective devices and between the respective user information processing devices. In the present embodiment, the respective fluid control devices 100 are connected to each other via communication cables C that conform with the standards of an industrial network such as, for example, Industrial Ethernet or the like. Hereinafter, the respective fluid control devices 100 will be described.

Figure 2:
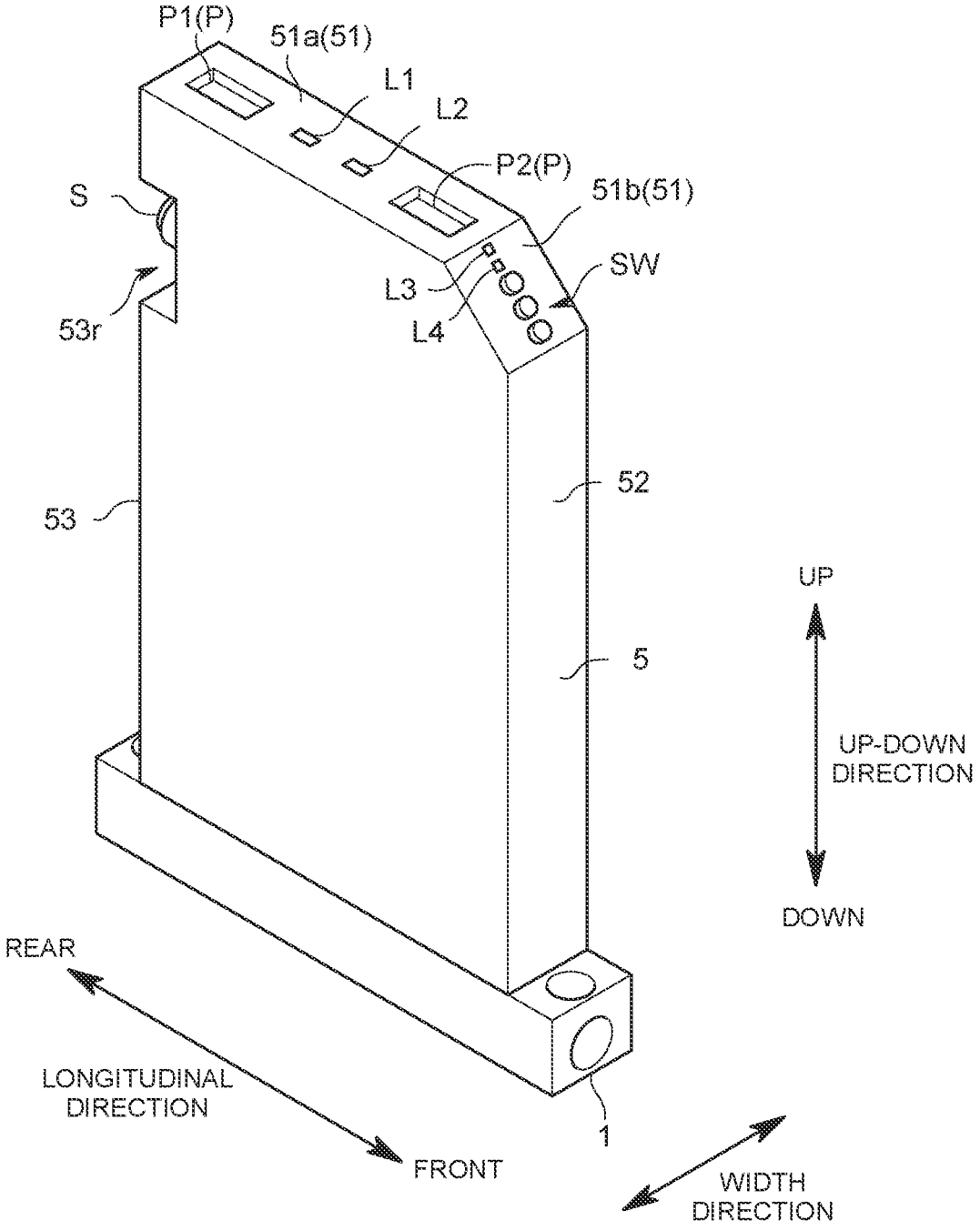
FIG. 2 is a perspective view showing a structure of a fluid control device of the same embodiment.
Figure 3:
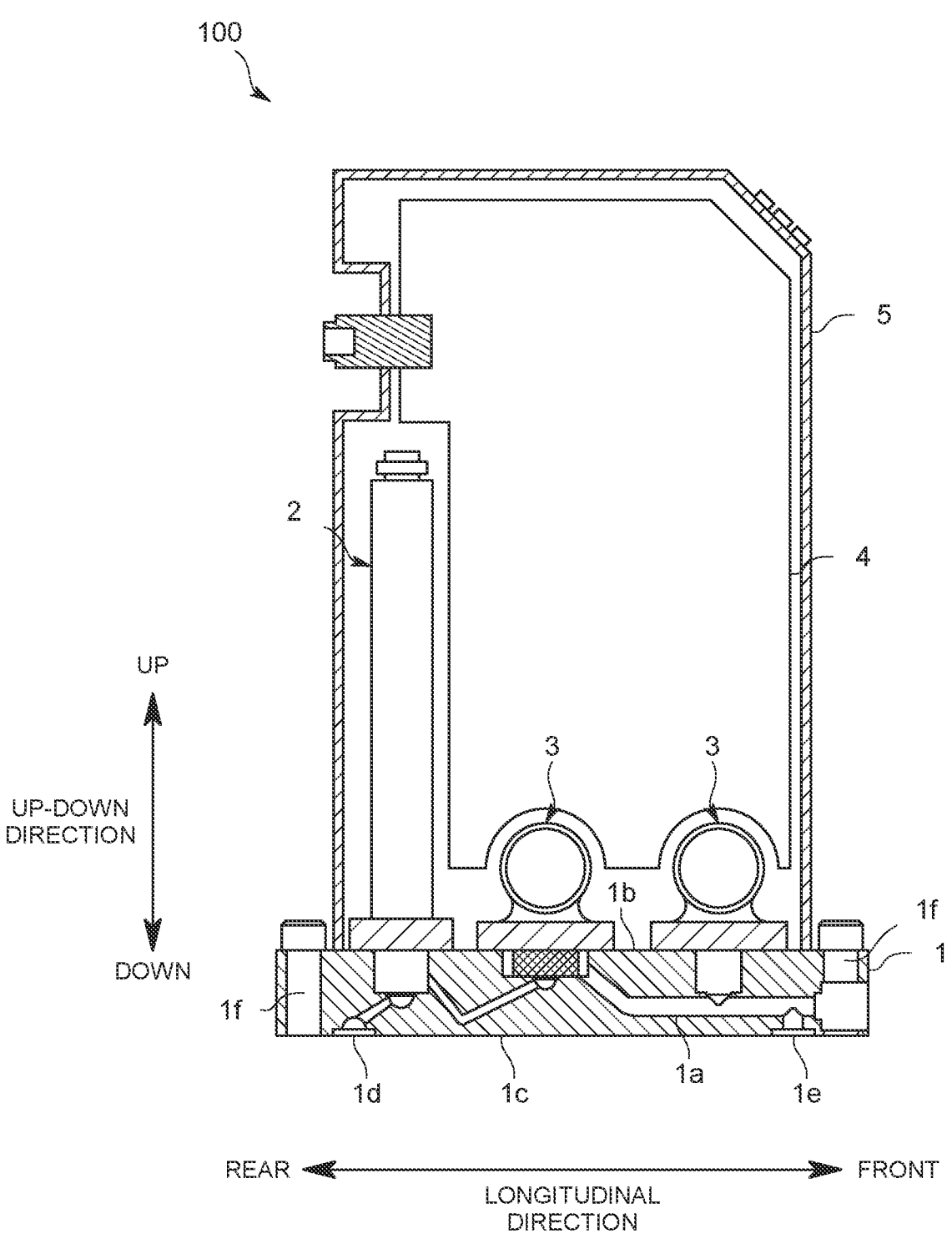
FIG. 3 is a view schematically showing an internal structure of the fluid control device of the same embodiment.

More specifically, as is shown in FIG. 2 and FIG. 3, each of these fluid control devices 100 is formed in a flat rectangular-parallelepiped shape and is equipped with a body 1 inside which is formed an internal flow path 1*a* through which a fluid flows, a fluid control valve 2 that is provided on the internal flow path 1*a*, flow rate sensors 3, an electrical circuit board 4 that transfers signals between the fluid control valve 2 and the flow rate sensors 3, and a casing 5 that houses these components.

The body 1 is made, for example, from metal in an elongated shape (more specifically, in a narrow, elongated rectangular-parallelepiped shape). One surface of the body 1 that extends in parallel with the longitudinal direction thereof is set as a component mounting surface 1*b*, and components such as the fluid control valve 2 and the flow rate sensors 3 and the like are mounted on this component mounting surface 1*b*. A surface on an opposite side from this component mounting surface 1*b* is formed as a fixing surface 1*c* that enables the body 1 to be fixed to a panel or the like. In the present embodiment, an intake port 1*d* of the internal flow path 1*a* opens at one end portion in the longitudinal direction of the fixing surface 1*c*, while a discharge port 1*e* of the internal flow path 1*a* opens at another end portion thereof. In addition, through holes 1*f* such as threaded holes or the like that enable the body 1 to be fixed in position by being screwed onto a panel or the like are formed at both end portions thereof in the longitudinal direction. These through holes 1*f* are provided on the outer sides in the longitudinal direction respectively of the intake port 1*d* and the discharge port 1*e*, and are formed such that they open onto both the component mounting surface 1*b* and the fixing surface 1*c*. Note that nothing is mounted on the other two surfaces of the body 1 that extend in parallel with the longitudinal direction (these may also be called side surfaces) so that a structure may be employed in which a plurality of fluid control devices 100 can be arranged with the respective side surfaces of the bodies 1 thereof positioned in contact with or in proximity to each other.

The internal flow path 1*a* extends from one end portion towards the other end portion in the longitudinal direction of the body 1. When viewed in an up-down direction which is a perpendicular direction relative to the component mounting surface 1*b*, the internal flow path 1*a* is formed such that a fluid flows substantially in parallel with this longitudinal direction. Note that, hereinafter, when looking in the up-down direction, a direction that is perpendicular to the longitudinal direction is referred to as a width direction. Moreover, a direction of travel of a fluid in the longitudinal direction is referred to as a forward direction, while the opposite direction thereto is referred to as a rearward direction.

Each fluid control valve 2 is formed in a columnar shape and is mounted perpendicularly onto the component mounting surface 1*b*. Moreover, each fluid control valve 2 is, for example, a piezo valve or the like that is formed so as to control the flow rate and the like of a fluid flowing through the internal flow path 1*a*.

The flow rate sensors 3 are mounted on the component mounting surface 1*b*, and measure the mass flow rate of a fluid flowing through the internal flow path 1*a* on a downstream side from the fluid control valve 2. The flow rate sensors 3 of the present embodiment are pressure-type flow rate sensors.

The electrical circuit board 4 is fixed by screws or the like onto the casing 5 in an upright state so as to be substantially perpendicular relative to the component mounting surface 1*b*. More specifically, this electrical circuit board 4 is produced by forming digital circuits such as a CPU, memory, and communication circuits and the like, together with analog circuits such as amplifiers and buffers and the like on a sheet-shaped component. The electrical circuit board 4 is formed such that, as a result of the CPU operating in mutual collaboration with additional peripheral devices thereof in accordance with programs stored in the memory, the flow rate of a fluid flowing through the internal flow path 1*a* is calculated based on measurement pressures obtained by the flow rate sensors 3, and the fluid control valve 2 is controlled so that the measured flow rate matches a previously determined target flow rate.

The casing 5 is mounted on the component mounting surface 1*b* side of the body 1 so that the fluid control valve 2, the flow rate sensors 3, and the electrical circuit board 4 are housed inside the casing 5. The casing 5 is formed substantially in a flat rectangular-parallelepiped shape whose width dimension remains substantially constant. The width dimension of the casing 5 is set so as to be substantially the same as the width dimension of the body 1, while the length direction of the casing 5 is set so as to be shorter than the length direction of the body 1.

Figures 4A, 4B, 4C:
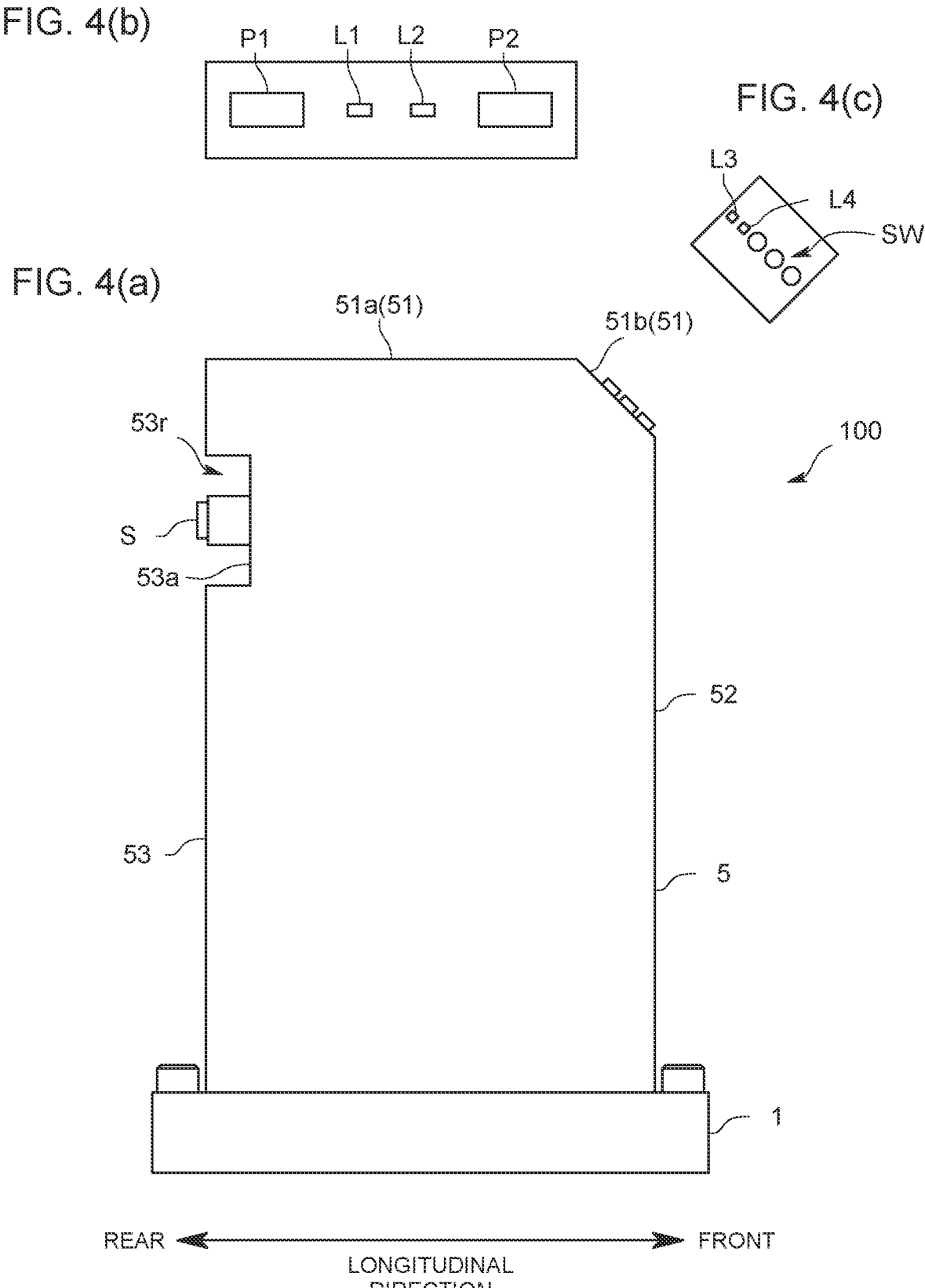
FIGS. 4(a)-(c) are plan views showing the structure of the fluid control device of the same embodiment, with FIG. 4(a) being a plan view as seen from a width direction, FIG. 4(b) being a plan view looking at a flat surface from a perpendicular direction relative thereto, and FIG. 4(c) being a plan view looking at a sloping surface from a perpendicular direction relative thereto.

In this way, in each fluid control device 100 of the present embodiment, as is shown in FIG. 2 and FIGS. 4(*a*)-(*c*), a flat surface 51*a* that is substantially parallel to the body 1, and a sloping surface 51*b* that slopes towards the body 1 are formed on a top surface 51, which is a surface of the casing 5 that faces towards the opposite side from the body 1. Note that the top surface 51 of the present embodiment is formed in an elongated shape extending in the longitudinal direction of the body 1.

The flat surface 51*a* and the sloping surface 51*b* are both formed in rectangular shapes having the same width dimensions as each other, and are formed so as to be continuous with each other in the longitudinal direction of the top surface 51. When viewed from the width direction of the body 1, the flat surface 51*a* is formed so as to be parallel to the component mounting surface 1*b*, while the sloping surface 51*b* is formed so as to slope rectilinearly at a constant angle of inclination (of more than 0° and less than 90°) from the boundary line where it joins the flat surface 51*a* towards the body 1.

The sloping surface 51*b* is formed at one end side in the longitudinal direction of the top surface 51. The sloping surface 51*b* of the present embodiment is formed at the front end in the longitudinal direction of the top surface 51, and is continuous with a front surface 52 of the casing 5 that faces in the forward direction. In other words, the sloping surface 51*b* of the present embodiment is sloped so as to approach closer to the body 1 the closer it is in the longitudinal direction towards the front.

The flat surface 51 of the present embodiment is continuous with a rear surface 53 of the casing 5 that faces in the rearward direction. Note that, when viewed from the width direction, the front surface 52 and the rear surface 53 of the casing 5 are formed so as to extend in a perpendicular direction relative to the component mounting surface 1*b* of the body 1.

Furthermore, communication ports P (i.e., communication connectors) that conform with an industrial network such as Industrial Ethernet (more specifically, with Ether-CAT) or the like, operating switches SW, and status lamps L are provided on the top surface 51 of the above-described casing 5.

Communication cables C that conform with the standards of an industrial network such as Industrial Ethernet or the like are connected to the communication ports P. Here, at least two communication ports P1 and P2 are arranged in the longitudinal direction on the flat surface 51*a* so as to connect respectively to the previous device and the subsequent device on the communication pathway.

The operating switches SW are used to perform operations (for example, setting ID and the like) on each fluid control device 100. Examples of the operating switches include rotary switches and the like that employ, for example, a decimal or hexadecimal rotary encoder. In the present embodiment, a plurality of (in this case, three) operating switches SW that correspond respectively to various types of operations are provided on the sloping surface 51*b*. The plurality of operating switches SW are arranged on the sloping surface 51*b* in a row running in the direction of the slope (i.e., in the longitudinal direction when looked at from the up-down direction).

The status lamps L are each provided with an LED light source that enables them to be illuminated. The mode of illumination (i.e., the color or the like) or the flashing mode thereof shows the operational status of the fluid control device 100. In the present embodiment, a plurality of status lamps L that serve as indicators to show various types of operational status are provided on the top surface 51. Here, an input-side link/act lamp L1 that shows a communication status of the input-side communication port P1, an output-side link/act lamp L2 that shows a communication status of the output-side communication port P2, a status lamp L3 that shows a state transition of the EtherCAT, and an error lamp L4 that indicates a communication abnormality are provided as status lamps L on the top surface 51. Note that, more specifically, the status lamp L3 is a RUN LED that shows a current state transition of an EtherCAT state machine.

In the present embodiment, the status lamps L are provided on both the flat surface 51*a* and the sloping surface 51*b*. On the flat surface 51*a*, a plurality of the status lamps L (here, the input-side link/act lamp L1 and the output-side link/act lamp L2) are provided between the two communication ports P1 and P2. The respective communication ports P1 and P2 are provided together with the respective status lamps L in a row extending in the longitudinal direction. More specifically, the input-side link/act lamp L1 is provided adjacent to the input-side communication port P1, while the output-side link/act lamp L2 is provided adjacent to the output-side communication port P2.

In addition, on the sloping surface 51*b*, a plurality of the status lamps L (here, the status lamp L3 and the error lamp L4) are provided in a row extending in the direction of the slope. More specifically, a plurality of the status lamps L and a plurality of the operating switches SW are provided in a row extending in the direction of the slope.

Furthermore, a power supply connector S to which a power supply cable is connected is provided on the rear surface 53 of the casing 5. In the present embodiment, a recessed portion 53*r* that is recessed towards the front in the longitudinal direction is formed in the rear surface 53 of the casing 5, and a connector installation surface 53*a* that is used to install the power supply connector S is provided on an inner surface (i.e., a bottom surface) of the recessed portion 53*r*. When looked at from the width direction, the connector installation surface 53*a* is formed so as to extend in a perpendicular direction relative to the component mounting surface 1*b* of the body 1. The power supply connector S is installed on the connector installation surface 53*a* so as to face towards the rear in the longitudinal direction. The power supply connector S is provided in such a way that a rearward end thereof is positioned in front of the rear-side through hole if formed in the body 1.

Moreover, the recessed portion 53*r* of the present embodiment is formed in the rear surface 53 in a position therein that does not include the two end portions (more specifically, the upper end portion) in the up-down direction. As a result, the flat surface 51*a* of the top surface 51 extends further in the rearward direction than the connector installation surface 53*a* inside the recessed portion 53*r*.

According to the fluid control device 100 of the present embodiment that is formed in the manner described above, because the sloping surface 51*b* that slopes towards the body 1 is formed on the top surface 51 of the casing 5, compared with a conventional structure in which the top surface 51 of the casing 5 simply extends flat in the longitudinal direction of the body 1, it is possible to increase the area of the top surface 51. As a consequence, in spite of there being restrictions on the device dimensions in the transverse and longitudinal directions of the body 1, it is nevertheless possible to increase the area of the top surface 51 where the communication ports P and the like can be installed.

Moreover, because the power supply connector S is provided in the recessed portion 53*r* that is formed in the rear surface 53, the portion of the power supply connector S that protrudes from the rear surface 53 can be reduced, and it is difficult for the power supply connector S to interfere with the hands or tools of a user when the fluid control device 100 is being fixed to a panel or the like via screws or bolts. In addition, because the flat surface 51*a* of the casing 5 extends further in the rearward direction than the bottom surface of the recessed portion 53*r* provided in the rear surface 53, it is possible to secure a sufficient area to install communication ports P or the like in the top surface 51 of the casing 5 while simultaneously improving workability during a mounting operation.

Note that the present invention is not limited to the above-described embodiment.

For example, in the above-described embodiment, a pressure-type mass flow controller is described as an example of the fluid control device 100, however, the present invention is not limited to this. It is also possible for a fluid control device 100 of another embodiment to be, for example, a thermal-type mass flow controller that is provided with thermal-type flow rate sensors 3. Moreover, the fluid control device 100 may be a device that controls the pressure of a fluid instead of a device that controls the flow rate thereof.

Figure 5:
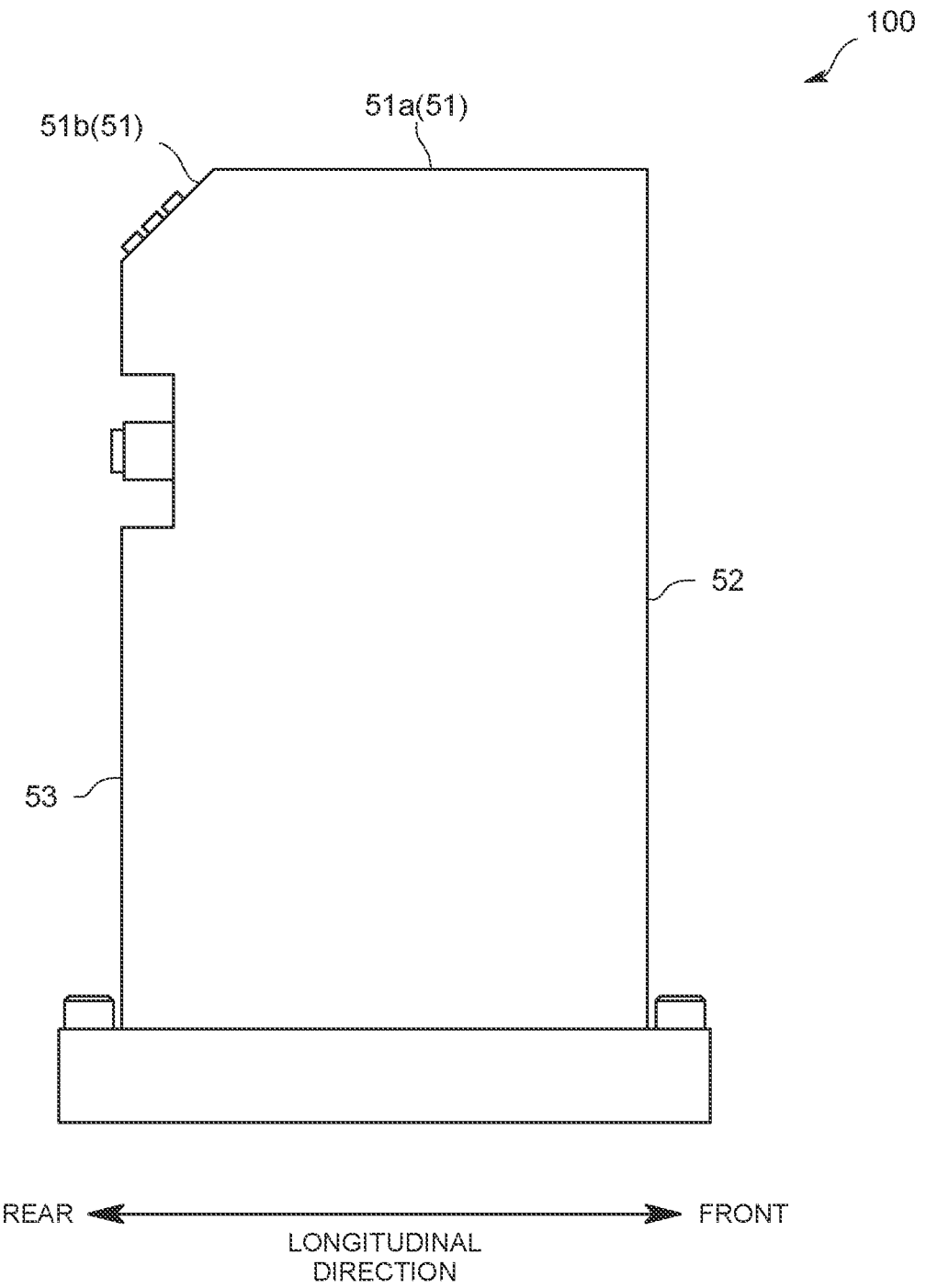
FIG. 5 is a plan view showing a structure of a fluid control device of another embodiment.
Figure 6:
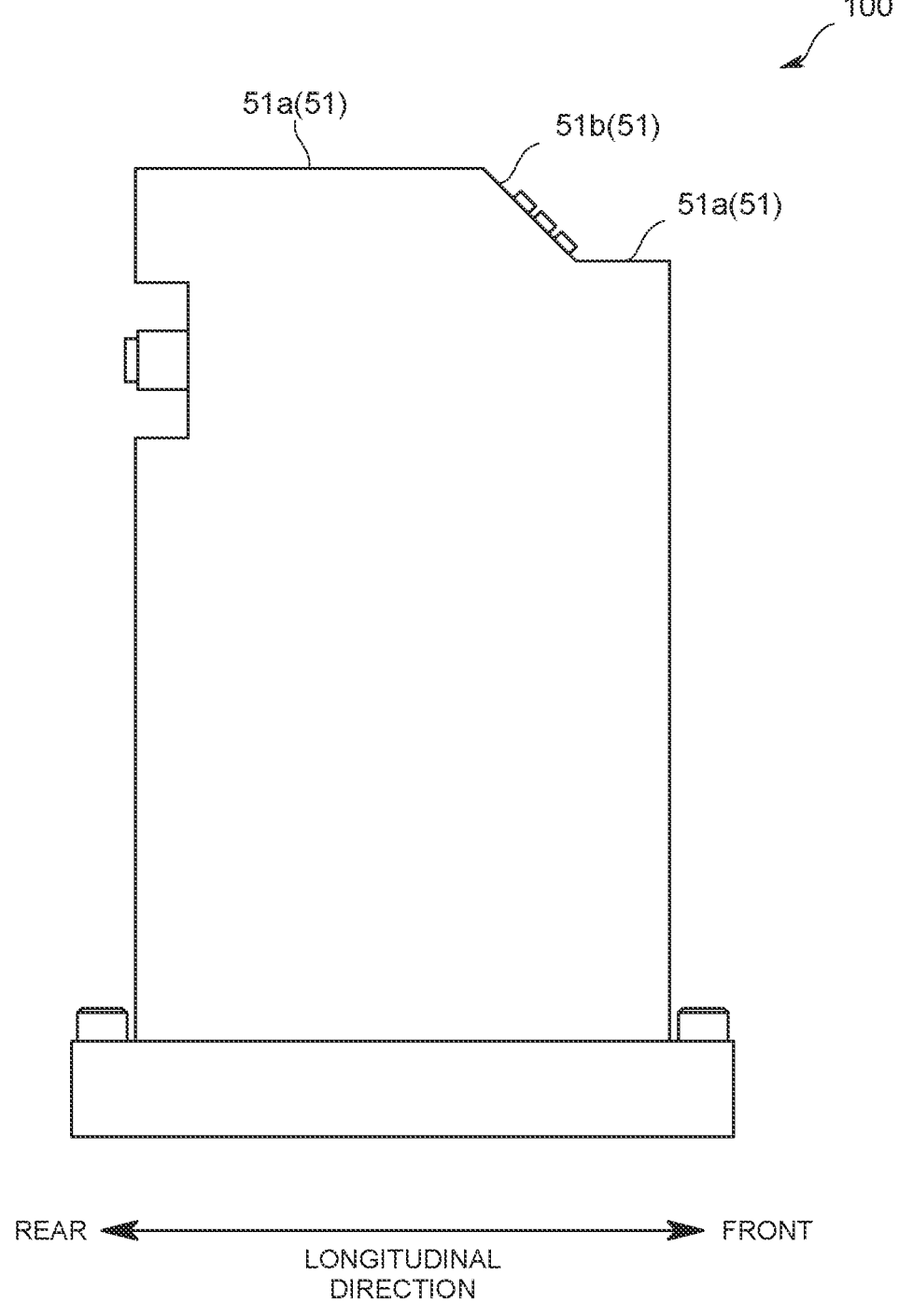
FIG. 6 is a plan view showing a structure of a fluid control device of another embodiment.

Furthermore, the sloping surface 51b of the above-described embodiment is formed at a front end in the longitudinal direction of the top surface 51, however, the present invention is not limited to this. For example, as is shown in FIG. 5, in another embodiment it is possible for the sloping surface 51b to instead be formed at a rear end in the longitudinal direction of the top surface 51. Moreover, it is also possible for the sloping surface 51b of yet another embodiment to not be formed at an end portion of the top surface 51. For example, as is shown in FIG. 6, it is also possible for the sloping surface 51b to be formed between a plurality of flat surfaces 51a that are formed in a step configuration.

Moreover, in each fluid control device 100 of the above-described embodiment, the body 1 and the top surface 51 of the casing 5 are formed having an elongated shape, however, the present invention is not limited to this. In a fluid control device 100 of yet another embodiment, it is possible for the body 1 and the top surface 51 of the casing 5 to be formed having a square shape.

Figure 7:
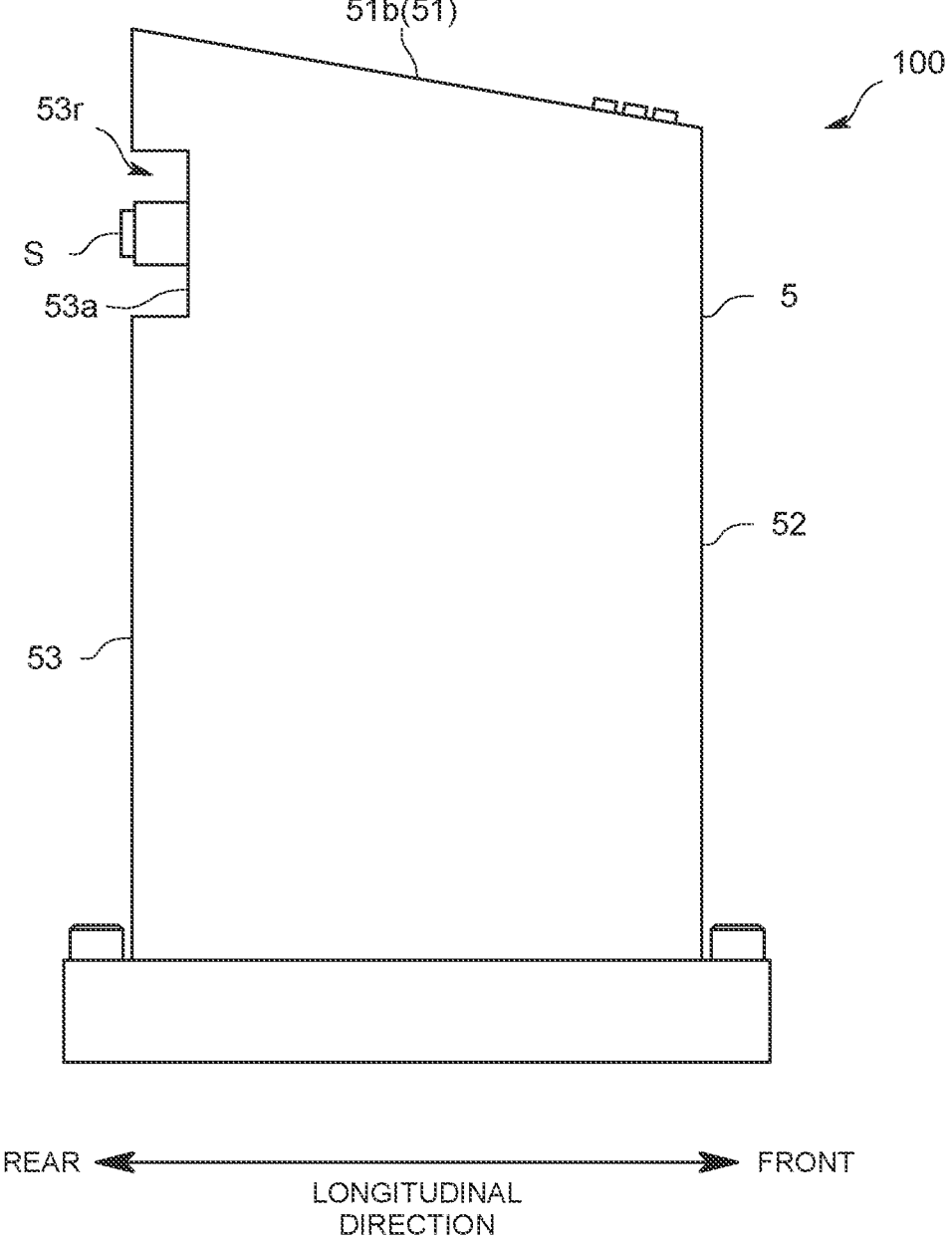
FIG. 7 is a plan view showing a structure of a fluid control device of another embodiment.
Figure 9:
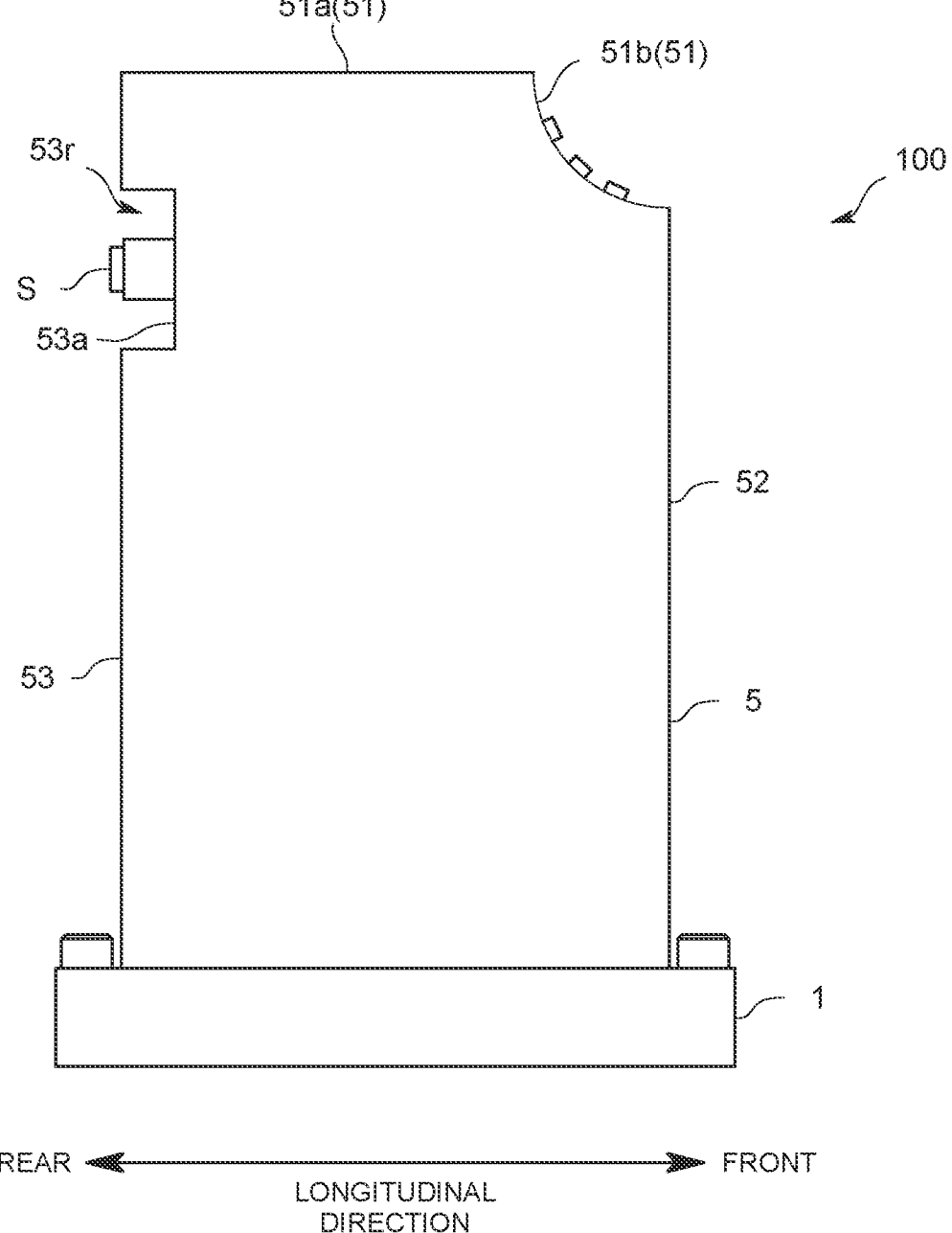
FIG. 9 is a plan view showing a structure of a fluid control device of another embodiment.
Figure 10:
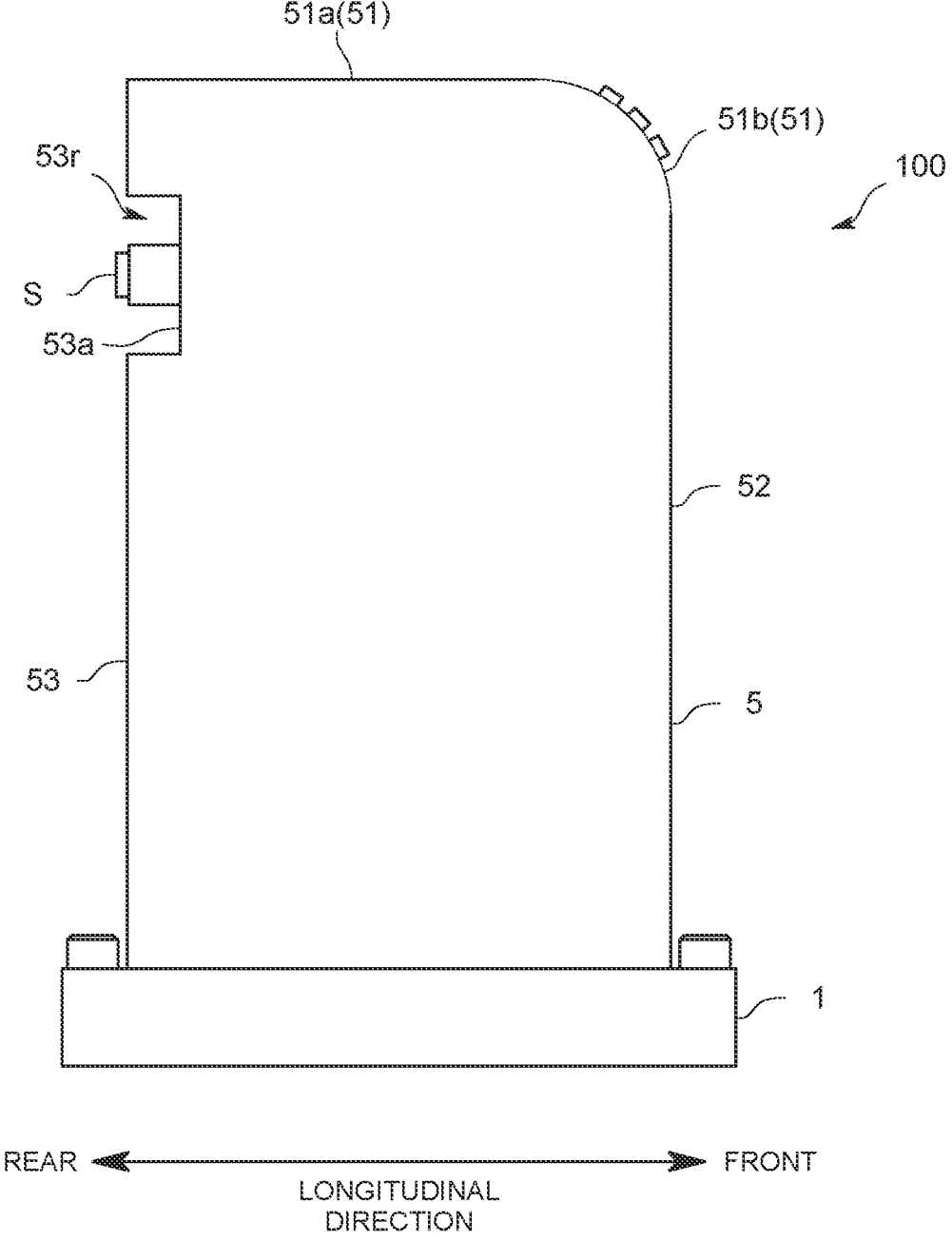
FIG. 10 is a plan view showing a structure of a fluid control device of another embodiment.

In addition, in the above-described embodiment, both the flat surface 51a and a sloping surface are formed on the top surface 51, however, the present invention is not limited to this. In yet another embodiment, as is shown in FIG. 7, it is possible for the top surface 51 to be formed solely by a sloping surface. Furthermore, the sloping surface 51 of the above-described embodiment is formed as a straight line so as to descend at a constant angle of inclination towards the body 1, however, the present invention is not limited to this. As is shown in FIG. 9 and FIG. 10, it is also possible for the sloping surface 51b of yet another embodiment to be formed as a curved line or as a polygonal line when viewed from the width direction.

Furthermore, in another embodiment, it is also possible for a plurality of sloping surfaces 51b that each have either the same or a mutually different angle of inclination to be provided on the top surface 51.

Figure 8:
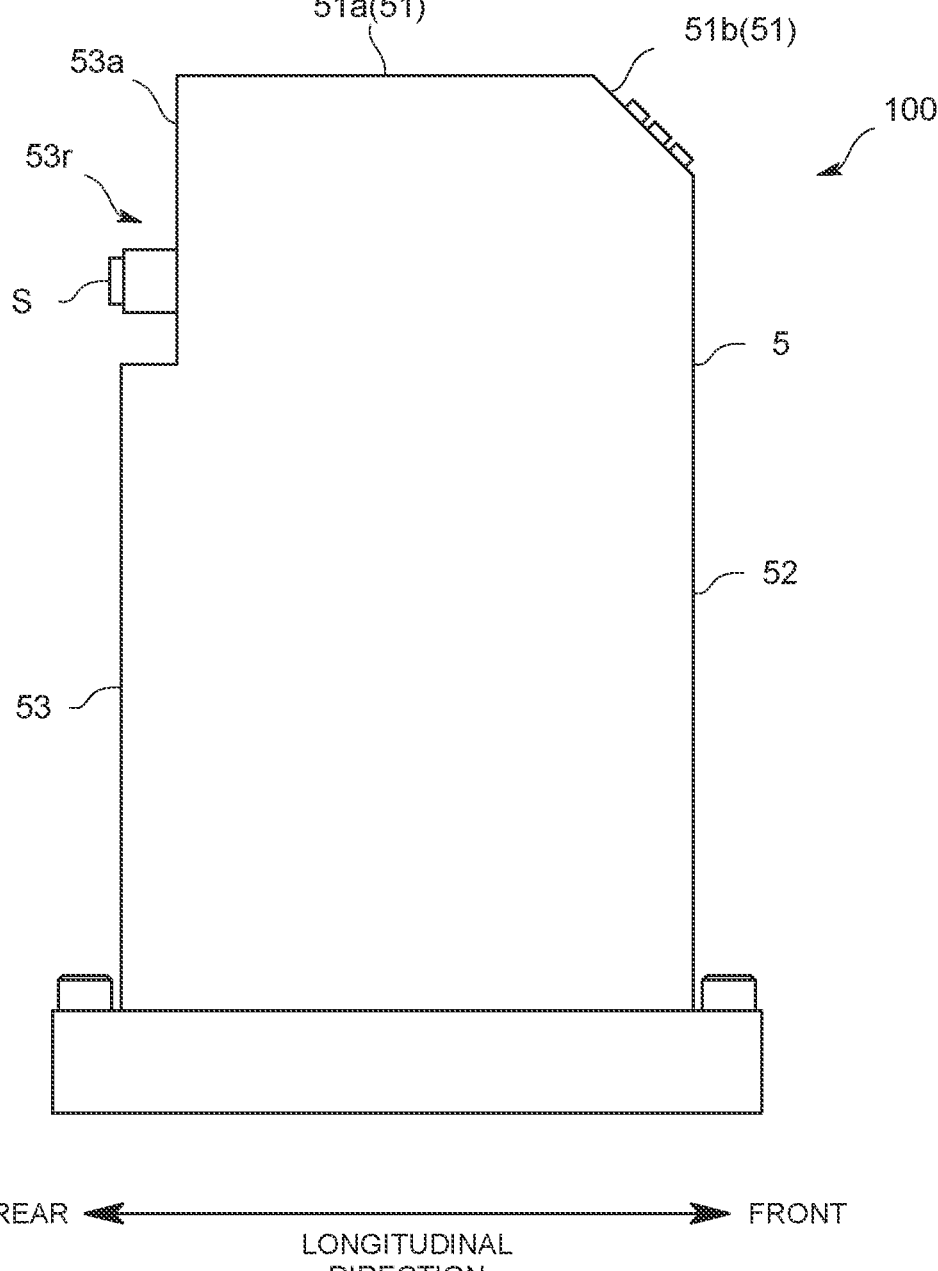
FIG. 8 is a plan view showing a structure of a fluid control device of another embodiment.

Moreover, the recessed portion 53r of the above-described embodiment is formed at a position on the rear surface 53 that does not include the two end portions (more specifically, the upper end portion) in the up-down direction, however, the present invention is not limited to this. As is shown in FIG. 8, in yet another embodiment, it is also possible for the recessed portion 53r to be formed at an upper end portion in the up-down direction of the rear surface 53.

In addition, the placement of the communication ports P, the operating switches SW, and the status lamps L on the top surface 51 in the above-described embodiment is only given as an example, and the present invention is not limited to this placement. It is also possible for the communication ports P, the operating switches SW, and the status lamps L to be provided on either one of the flat surface 51a and the sloping surface 51b, and for the communication ports P, the operating switches SW, and the status lamps L to not be arranged in a row in the longitudinal direction.

Moreover, the fluid control devices 100 of the above-described embodiment conform with EtherCAT, however, they may also be formed so as to conform with another communication standard. In addition, the fluid control devices 100 of yet another embodiment are not limited to being devices that conform with an industrial network such as Industrial Ethernet and the like.

Furthermore, it should be understood that the present invention is not limited to the above-described embodiment, and that various modifications and the like may be made thereto insofar as they do not depart from the spirit or scope of the present invention.

DESCRIPTION OF THE REFERENCE
CHARACTERS

100 . . . Fluid Control Device
1 . . . Body
1a . . . Flow Path
2 . . . Fluid Control Valve
5 . . . Casing
51 . . . Top Surface
51a . . . Flat Surface
51b . . . Sloping surface
P . . . Communication Port
L . . . Status Lamp
SW . . . Operating Switch
C . . . Communication Cable

What is claimed is:

1. A fluid control device comprising:
a body inside which is formed a flow path;
a fluid control valve that is mounted on the body and controls a fluid flowing through the flow path; and
a casing that is mounted on the body in such a way as to house the fluid control valve, wherein
a sloping surface that slopes towards the body is formed on a top surface of the casing, which is a surface facing towards an opposite side from the body,
at least two Industrial Ethernet communication ports are provided on the top surface of the casing and are arranged in a line along a longitudinal direction of the top surface, the at least two Industrial Ethernet communication ports being disposed along a center of the top surface in a width direction, the width direction being orthogonal to the longitudinal direction,
the at least two Industrial Ethernet communication ports are spaced apart from each other along the longitudinal direction by a distance corresponding to at least one port, and
the sloping surface has a shape extending longer in the longitudinal direction than in the width direction, and a plurality of status lamps showing operational statuses of the fluid control device and/or a plurality of operating switches that are used to perform operations on the fluid control device are provided on the sloping surface and are arranged in a row along the longitudinal direction.

2. The fluid control device according to claim 1, wherein the plurality of status lamps are provided on the sloping surface.

3. The fluid control device according to claim 1, wherein the plurality of operating switches are provided on the sloping surface.

4. The fluid control device according to claim 1, wherein a flat surface that is parallel to the body is formed on the top surface of the casing,
two of the at least two Industrial Ethernet communication ports are provided on the flat surface, and
status lamps configured to show a communication state of respective ones of the two Industrial Ethernet communication ports are provided adjacent to the two Industrial Ethernet communication ports on the flat surface.

5. The fluid control device according to claim 1, wherein the at least two Industrial Ethernet communication ports conform with an industrial network.

6. The fluid control device according to claim 4, wherein the top surface is formed in an elongated shape, and the flat surface and the sloping surface are formed so as to be continuous in the longitudinal direction of the top surface.

7. The fluid control device according to claim 6, wherein the sloping surface is formed at one-end side or at another-end side of the top surface of the casing in the longitudinal direction thereof.

8. The fluid control device according to claim 6, wherein a power supply connector to which is connected a predetermined power supply cable is provided either at a front surface or a rear surface of the casing so as to face towards one side or another side of the top surface in the longitudinal direction thereof.

9. The fluid control device according to claim 8, wherein the power supply connector is provided on a bottom surface of a recessed portion that is formed in the front surface or rear surface of the casing.

10. The fluid control device according to claim 9, wherein the flat surface of the casing extends further outwards in the longitudinal direction than the bottom surface of the recessed portion that is formed in the front surface or rear surface.

11. A fluid control system comprising the fluid control device according to claim 1, wherein the top surface of the fluid control device is formed in an elongated shape, and air-pressure valves that shut off a flow of a fluid flowing through the flow path are provided at the front and at the rear in the longitudinal direction of the top surface of the casing.

* * * * *